(12) United States Patent
Reckziegel et al.

(10) Patent No.: US 10,490,084 B2
(45) Date of Patent: Nov. 26, 2019

(54) METHOD FOR TRANSFORMING SENSOR DATA

(71) Applicant: Robert Bosch GmbH, Stuttgart (DE)

(72) Inventors: Bastian Reckziegel, Kirchheim/Nabern (DE); Erich Sonntag, Marbach Am Neckar (DE); Gian Antonio D' Addetta, Stuttgart (DE); Johannes Foltin, Ditzingen (DE); Sybille Eisele, Hessigheim (DE)

(73) Assignee: Robert Bosch GmbH, Stuttgart (DE)

( * ) Notice: Subject to any disclaimer, the term of this patent is extended or adjusted under 35 U.S.C. 154(b) by 82 days.

(21) Appl. No.: 15/673,470

(22) Filed: Aug. 10, 2017

(65) Prior Publication Data

US 2018/0053420 A1 Feb. 22, 2018

(30) Foreign Application Priority Data

Aug. 18, 2016 (DE) .......................... 10 2016 215 538

(51) Int. Cl.
*G08G 1/00* (2006.01)
*G08G 1/16* (2006.01)
*G08G 1/01* (2006.01)
*G08G 1/056* (2006.01)

(52) U.S. Cl.
CPC ........... *G08G 1/167* (2013.01); *G08G 1/0104* (2013.01); *G08G 1/056* (2013.01)

(58) Field of Classification Search
CPC ...... G08G 1/167; G08G 1/0104; G08G 1/056; G08G 1/0112; G08G 1/163; G08G 1/166; B60W 30/08
See application file for complete search history.

(56) References Cited

U.S. PATENT DOCUMENTS

2009/0299615 A1* 12/2009 Denaro .................. G01C 21/26
701/117
2014/0341434 A1* 11/2014 Lin ......................... G08G 1/166
382/104
2018/0032085 A1* 2/2018 Dolgov ................ G05D 1/0248

FOREIGN PATENT DOCUMENTS

DE       102014211530 A1    12/2015

* cited by examiner

*Primary Examiner* — Adam D Tissot
(74) *Attorney, Agent, or Firm* — Norton Rose Fulbright US LLP; Gerard Messina

(57) ABSTRACT

A method for transforming data of a sensor. First data of a first sensor of a first vehicle and a first position are initially provided. The first data include a first distance and a first direction to an object. The first position includes a location of the first sensor at which the first data were ascertained. A second position of a second vehicle is additionally provided. The first data are subsequently converted into transformed data based on the first position and the second position, the transformed data including a second distance and a second direction. The second distance is a distance between the object and the second position. The second direction is a direction between the object and the second position. The transformed data are subsequently output.

16 Claims, 4 Drawing Sheets

METHOD FOR TRANSFORMING SENSOR DATA

CROSS REFERENCE

The present application claims the benefit under 35 U.S.C. § 119 of German Patent No. DE 102016215538.5 filed on Aug. 18, 2016, which is expressly incorporated herein by reference in its entirety.

FIELD

In certain conventional methods, sensor data of a preceding vehicle are transmitted to a following vehicle and are shown on a display in the following vehicle. This may be used, for example, to decide whether or not it is possible safely to carry out a passing maneuver based on the objects on a road detected by the preceding vehicle. A method of this type is described in German Patent No. DE 10 2014 211 530 A1.

SUMMARY

One object of the present invention is to provide an improved method for transmitting data of a sensor that is associated with a vehicle. Another object of the present invention is to provide a processing unit which is configured to carry out the method.

These objects may be achieved in accordance with the present invention. Advantageous embodiments are described herein.

In accordance with the present invention, an example method for transforming data of one or multiple sensor(s) includes the following steps:
  providing first data, the first data having been ascertained with the aid of at least one sensor of a first vehicle, and a first position, the first data including a first distance and a first direction to an object, and the first position including a location of the first vehicle at which the first data were ascertained;
  providing a second position of a second vehicle;
  converting the first data based on the first position and the second position into transformed data. The transformed data include a second distance and a second direction. The second distance is a distance between the object and the second position, the second direction is a direction between the object and the second position;
  outputting the transformed data.

The first and the second positions may be designed as location positions or as a relative position of the first vehicle in relation to the second vehicle.

The first data of one or multiple sensor(s) of the first vehicle thus include a direction and a distance to an object. By converting the first data into transformed data based on the first position and the second position, the first data is converted in such way as if the first vehicle were located at the second position during the ascertainment of the first data. The transformed data include a distance and a direction between the second position and the object. The transformed data are subsequently output, the outputting of the data taking place either to the driver of the vehicle of to a processing unit for further use of the transformed data.

In one specific embodiment of the method, the first data are ascertained from first raw data from multiple sensors of the first vehicle. The first data include in this case a fusion of the first raw data. In this way, the first data, i.e., the distance and the direction to an object, may be ascertained by evaluating multiple sensors of the first vehicle. The reliability of the first data is thus increased.

The fusion may occur in such a way that distances and directions to detected objects are respectively ascertained from the raw data. If, in the case of a detected object, the raw data of multiple sensors should respectively exhibit the same distance and the same direction to this detected object, then this detected object is taken into consideration only once in the fusion of the raw data.

In one specific embodiment of the method, the method includes the following further steps:
  providing second data, the second data having been ascertained with the aid of at least one sensor of the second vehicle, the second position including a location of the second vehicle at which the second data were ascertained;
  superimposing the transformed data and the second data, superimposed data being ascertained as a result of the superimposition;
  outputting the superimposed data.

In this case, the second data may in turn include further distances and directions to additional objects and more comprehensive information about directions and distances to objects may be obtained by superimposing the transformed data and the second data. This is expedient in particular when an obstacle between the second position and the object, which is detected by one or multiple sensor(s) of the first vehicle, renders impossible an ascertainment of a distance and a direction between the object and the second position.

In one specific embodiment of the method, the second data are ascertained from second raw data of multiple sensors of the second vehicle. The second data include in this case a fusion of the second raw data. In this way, the second data, i.e., the distance and the direction to an object, may be ascertained by evaluating multiple sensors of the second vehicle. The reliability of the second data is thereby increased.

The fusion may occur in such a way that distances and directions to detected objects are respectively ascertained from the raw data. If, in the case of a detected object, the raw data of multiple sensors should respectively have the same distance and the same direction to this detected object, then this detected object is taken into consideration only once in the fusion of the raw data.

In one specific embodiment, the conversion of the first data is carried out by a processing unit of the second vehicle. The second data are provided by a reading out of one or multiple sensor(s), which are respectively associated with the second vehicle. The second position is provided with the aid of a position sensor, the position sensor being installed in the vehicle. In this way, objects, which were detected by one or multiple sensor(s) of the first vehicle and were allocated a distance and a direction between the first position and the object, but which cannot be detected by one or multiple sensor(s) of the second vehicle due to an obstacle being located between the second vehicle and the object, may be advantageously also taken into consideration if directions and distances to objects are to be indicated based on the second vehicle.

In one specific embodiment of the method, the first data and the second data include image data. The transformed data include a conversion of a first perspective of the first position of the first data into a second perspective of the second position. The transformed data and the second data are superimposed to form a fused image. The image taken by the sensor which is assigned to the first vehicle is thus changed in its perspective in such a way as if it were taken at the second position. This corresponds to the transformed data which thus include image data which are changed in their perspective. An image taken by a sensor of the second vehicle is now superimposed using these transformed image data and yields a more comprehensive image of the objects on a roadway. For this purpose, information about a distance and a direction to an object is to be obtained from the image data with the aid of image recognition of objects and evaluation of the images, for example.

In one specific embodiment, the first data and the first position data are ascertained with the aid of an image sensor installed in the vehicle. This is possible if the first data are visually displayed on the rear panel of a truck as the first vehicle, for example. Systems in which a truck is equipped with a camera at the front side and a display at the rear side are related art. This image which is provided on the rear side of the truck is now recorded with the aid of an image sensor located in the second vehicle driving behind the truck and the perspective of the image is converted into a perspective of the following second vehicle. In this case, the first position may be ascertained from the image, ascertained by the image sensor, of the display on the rear side of the truck, as a relative position, for example. This specific embodiment is advantageous because radio contact between the vehicles is not necessary.

In one specific embodiment, the first data and the first position are received with the aid of a receiver unit of the second vehicle prior to being provided. In this case, there is radio contact between the vehicle and another vehicle, the sensor data of which are transmitted. A transmission of the first data and of the first position via radio contact represents a simple possibility of transmitting sensor data between vehicles. The radio contact may be a wireless network connection, a mobile radio connection or a connection to a cloud server.

In one specific embodiment of the method, the superimposed and/or the transformed data are displayed in the second vehicle. This may occur, for example, via a head-up display on the windshield, via a screen or via another augmented reality-based visualization device for the driver. By displaying the transformed and/or superimposed data, the driver of the vehicle may be provided with more information compared to what the driver perceives by looking through a windshield of the vehicle. Alternatively or additionally, it may be provided that a warning message is displayed on the screen, the head-up display or the other visualization device.

In one specific embodiment of the method, the superimposed and/or the transformed data are taken into consideration when carrying out a driving function of the second vehicle. This allows for an improved performance of a driving function, since additional transformed or superimposed data are available which may be taken into consideration when controlling the vehicle. In this context, an automated performance of a driving function means that a speed change (braking, accelerating) and/or a steering movement are carried out in an automated manner, i.e., without control command from the driver.

In one specific embodiment, a computation is performed on the basis of the superimposed and/or the transformed data whether a passing maneuver may be carried out by the second vehicle. Subsequently, information about a potential passing maneuver is output. This may, in turn, be carried out by a display, an acoustic signal or another signal to be detected by the driver, it being also possible, however, to relay the information to a device for the automated performance of a driving function. This makes it possible to simplify passing maneuvers and make them safer.

In one specific embodiment, the method is carried out by a central processing unit. The first data, the first position and/or the second position are received with the aid of a receiver unit of the central processing unit prior to being provided. The transformed data are then output with the aid of a transmitter.

In one specific embodiment, the method is carried out by a central processing unit, the first data, the first position, the second data and/or the second position being received with the aid of a receiver unit of the central processing unit prior to being provided. In this way, all the information necessary for carrying out the method are made available to the processing unit. The superimposed data are then output with the aid of a transmitter.

In one specific embodiment of the method, the first and the second data include image data. The transformed data include a conversion of a first perspective of the first position of the first data into a second perspective of the second position. The transformed data and the second data are superimposed to form a fused image. Subsequently, this fused image may in turn be provided to vehicles. Information about a distance and a direction to an object are to be obtained from the image data with the aid of image recognition of objects and evaluation of the images, for example.

In one specific embodiment of the method, the superimposed data and/or the transformed data are output to a vehicle via radio contact. This allows for the transformed and/or superimposed data to be relayed to a vehicle.

In one specific embodiment of the method, a computation is performed on the basis of the superimposed and/or the transformed data whether a passing maneuver may be carried out. Information about a potential passing maneuver is transmitted to a vehicle. In this way, information about potential passing maneuvers may be computed by a central processing unit and relayed to vehicles.

In one specific embodiment of the method, a signal quality of the second data is ascertained based on the transformed data and the second data. The signal quality is subsequently output. This may be used, for example, when deviations between distances and directions of detected objects result from the transformed data and the second data, and it may thus be checked whether the second sensor provides reliable data.

In one specific embodiment, the first position and/or the second position is/are compared to information about dangerous route segments stored in a map. A safety parameter is assigned to the transformed data based on the comparison between the first position and/or the second position and the information stored in the map, and the safety parameter is output. The safety parameter may indicate to what extent a device for carrying out a driving function should take the transformed data into consideration when carrying out the driving function. In dangerous spots, a less pronounced consideration of the transformed data occur, for example, in that only transformed data of an object, whose first data were transmitted by multiple other vehicles, are taken into consideration, but not first data transmitted only by one other vehicle.

A processing unit is configured to carry out one of the methods. For this purpose, the processing unit is equipped with the necessary interfaces, for example for the radio transmission of data or for the connection of sensors. Furthermore, a computer program which is used for carrying out the method is implemented on the processing unit. This computer program may be installed from a data carrier on the processing unit. The computer program for carrying out the method may thus be provided on a data carrier in the form of program code.

The present invention is described in greater detail below with reference to the figures.

DETAILED DESCRIPTION OF EXAMPLE EMBODIMENTS

Figure 1:
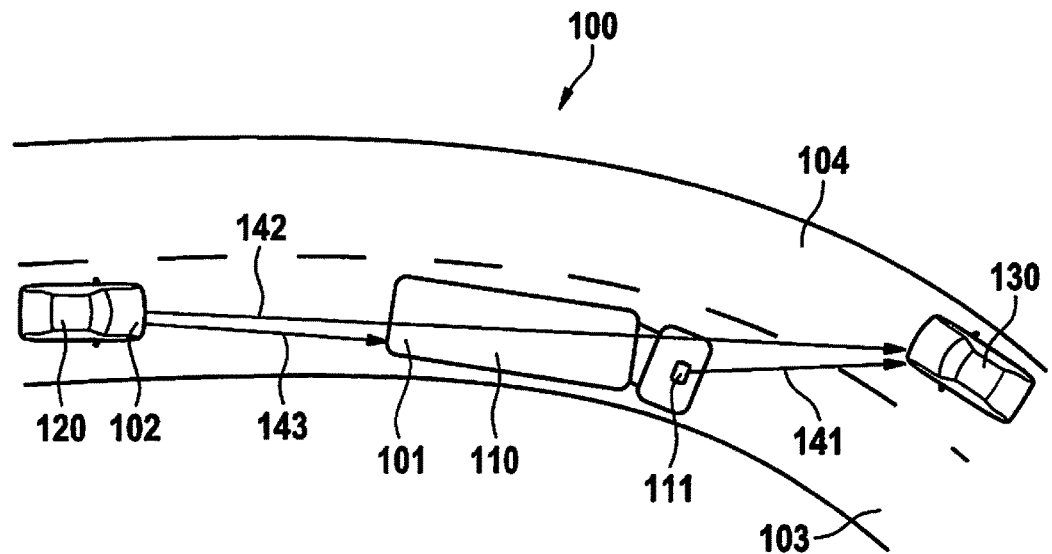
FIG. 1 schematically shows a course of the road including vehicles, one vehicle carrying out the method.

FIG. 1 shows a course of the road 100 on which a first vehicle 110 is situated ahead of a second vehicle 120. Vehicles 110, 120 are located on a first lane 103 and are oriented in the same travel direction. Opposed to the travel direction of first vehicle 110 and second vehicle 120, a third vehicle 130 is situated on course of the road 100. Third vehicle 130 is thus located on a second lane 104 which is opposed to first lane 103. Second vehicle 120 and third vehicle 130 are illustrated in this case as passenger cars, and first vehicle 110 is illustrated as a truck. First vehicle 110 is located in a first position 101, and second vehicle 120 is located in a second position 102. A first sensor 111 is situated in first vehicle 110. First sensor 111 ascertains first data which include a direction and a distance to third vehicle 130, i.e., to an object on roadway 100. The first direction and the first distance between first sensor 111 and third vehicle 130 are illustrated as first vector 141 in FIG. 1.

The first data of first sensor 111 and first position 101 are provided. Here, the first data include a first distance and a first direction to third vehicle 130 which is represented by first vector 141. First position 101 corresponds to the location at which the first data were ascertained with the aid of first sensor 111. Furthermore, second position 102 is provided for the purpose of carrying out the method. The first data are converted into transformed data based on first position 101 and second position 102. The transformed data include a second distance and a second direction between the object, i.e., third vehicle 130, and second position 102. This second distance and the second direction are illustrated by a second vector 142. It is furthermore illustrated in FIG. 1 that second vector 142 runs through first vehicle 110. A sensor, which is potentially located in second vehicle 120, would therefore not be capable of ascertaining a distance and a direction of second vehicle 120 to third vehicle 130, since first vehicle 110 is situated between second and third vehicles 120, 130. The transformed data, which include the direction and the distance between second vehicle 120 and third vehicle 130 and are represented by second vector 142, are subsequently output.

First position 101 and second position 102 may be provided as absolute positions or as relative positions to one another. If first position 101 and second position 102 are provided as relative positions, first position 101 and second position 102 include a distance and a direction between second vehicle 120 and first vehicle 110. In FIG. 1, this is visualized by third vector 143. Vector 143 between second vehicle 120 and first vehicle 110 thus corresponds to the relative position between first position 101 of first vehicle 110 and second position 102 of second vehicle 120.

In this case, the method may be carried out by a processing unit in first vehicle 110 as well as by a processing unit in second vehicle 120.

It may be provided that vehicles 110, 120, 130 move on lanes 103, 104, and positions 101, 102 and vectors 141, 142, 143 therefore continuously change. Speeds and accelerations of vehicles 110, 120, 130 may also be ascertained from the continuously changing positions 101, 102 and vectors 141, 142, 143.

In one exemplary embodiment, first vehicle 110 includes multiple first sensors 111. The first sensors each ascertain raw data. The first data, which are represented by first vector 141, includes a fusion of the raw data ascertained with the aid of first sensors 111. The fusion of the raw data may be performed by a processing unit installed in first vehicle 110. It is furthermore possible that the raw data of first sensors 111 are relayed to second vehicle 120 and the fusion of the raw data of first sensors 111 is performed by a processing unit of second vehicle 120.

First sensor 111 or first sensors 111 may in this case be image sensors such as a camera, radar sensors, LIDAR sensors, or ultrasonic sensors, for example.

For example, with the aid of a camera and an appropriate object recognition method, it is possible to ascertain a distance and a direction to an object recorded by the camera. A radar sensor also provides a distance and a direction to an object. If an identical distance and an identical direction result for an object ascertained from the image of the camera and for an object ascertained from the raw data of the radar sensor, it may be deduced that the object is identical. In this case, the object is taken into consideration only once in the fusion of the raw data.

Figure 2:
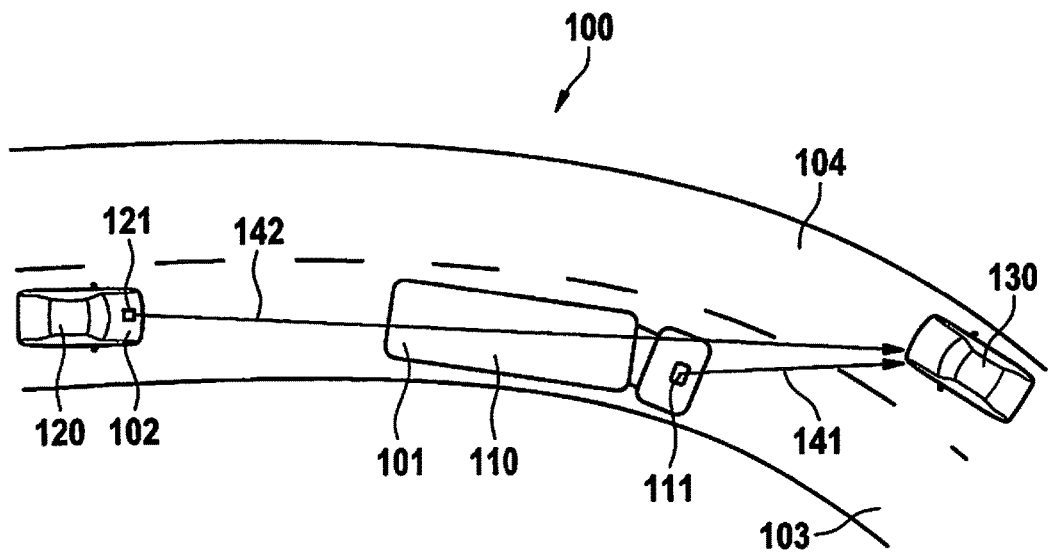
FIG. 2 schematically shows another course of the road of this type.

FIG. 2 shows a course of the road 100 including vehicles 110, 120, 130 of FIG. 1. Second vehicle 120 additionally includes a second sensor 121. Now, second data of second sensor 121 may be provided to carry out the method. Second position 102 includes a location at which the second data of second sensor 121 were ascertained. The transformed data already described in FIG. 1 and the second data are superimposed and superimposed data are ascertained in the process. Subsequently, the superimposed data are output.

In one exemplary embodiment, first position 101 and second position 102 are provided with the aid of position sensors installed in vehicles 110, 120.

In one exemplary embodiment, first sensor 111 and second sensor 121 are image sensors, i.e., cameras for example. The first data and the second data thus include image data which allow for a different perspective of course of the road 100 in each case. The data are transformed in such a way that a first perspective of first position 101 of the first data is converted into a second perspective of second position 102. The transformed data and the second data are then superimposed to form a fused image which is available from the perspective of second position 102 of first vehicle 110.

In one exemplary embodiment, second vehicle 120 includes multiple second sensors 121. The second sensors each ascertain raw data. The second data, which is represented by second vector 142, includes a fusion of the raw data ascertained with the aid of second sensors 121. The fusion of the raw data may be performed by a processing unit installed in second vehicle 120.

Second sensor 121 or second sensors 121 may in this case be image sensors such as a camera, radar sensors, LIDAR sensors, or ultrasonic sensors, for example.

For example, with the aid of a camera and an appropriate object recognition method, it is possible to ascertain a distance and a direction to an object recorded by the camera. A radar sensor also provides a distance and a direction to an object. If an identical distance and an identical direction result for an object ascertained from the image of the camera and for an object ascertained from the raw data of the radar sensor, it may be deduced that the object is identical. In this case, the object is taken into consideration only once in the fusion of the raw data.

Figure 3:
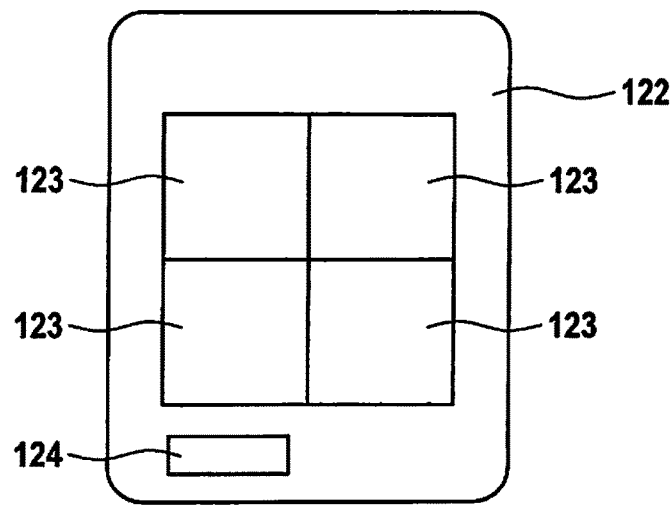
FIG. 3 schematically shows a truck rear panel including display elements.

FIG. 3 shows a rear panel 122 of first vehicle 110, i.e., a rear panel 122 of a truck. Four displays 123 are situated on this rear panel 122. First sensor 111 (not illustrated) is designed as a camera. The image of the camera is displayed on the four displays 123 on rear panel 122 of first vehicle 110. It is also conceivable that a different number of displays 123 is used. Second sensor 121 of second vehicle 120 is also a camera which records the image on displays 123. By ascertaining a distance and a direction between first vehicle 110 and second vehicle 120, the image, which is displayed on rear panel 122 of first vehicle 110, may be converted into a perspective of second vehicle 120. This may be achieved for example by ascertaining and providing a position of first vehicle 110 and of second vehicle 120. It is furthermore also possible to ascertain with the aid of second sensor 121 a relative position between first position 101 and second position 102, for example based on traffic signs displayed on displays 123, which are also detected by second sensor 121.

Further information, for example the length of first vehicle 110, may be provided in an optional information field 124 on rear panel 122 of first vehicle 110 for the purpose of inferring from this information what change in perspective is necessary for the image on displays 123. The position of first vehicle 110 may furthermore be displayed in information field 124. The information may be displayed using a bar code or a QR code, for example, since these codes may be easily read by image sensors.

In one specific embodiment, the first data and first position 101 are received with the aid of a receiver unit of the vehicle prior to being provided. This may occur, for example, with the aid of a receiver unit installed in second vehicle 120 of FIG. 1 or 2.

In one specific embodiment, the superimposed and/or the transformed data are displayed. This may occur, for example, on a screen in second vehicle 120 or via a head-up display in second vehicle 120.

In one exemplary embodiment, the superimposed data and/or the transformed data are taken into consideration when carrying out a driving function of second vehicle 120. For this purpose, second vehicle 120 may, for example, include a device for carrying out a driving function, the device for carrying out a driving function in an automated manner including a data input for the superimposed and/or for the transformed data. In this context, an automated driving function may be a steering movement, an acceleration, or a braking action of second vehicle 120. The automated driving function may also support a control input on the part of a driver, for example by boosting the breaking effect after the driver actuates a brake pedal.

In one exemplary embodiment, it is computed based on the superimposed and/or the transformed data whether a passing maneuver may be carried out by second vehicle 120. Information about a potential passing maneuver is output. Such a passing maneuver is not possible in FIGS. 1 and 2 since third vehicle 130 is oncoming with respect to second vehicle 120 and first vehicle 110. If second vehicle 120 were to drive in the oncoming lane in order to pass first vehicle 110, second vehicle 120 would risk a collision with oncoming third vehicle 130. In this case, the information would consequently include the message that a passing maneuver is not possible. If, however, there was no third vehicle 130 ahead of first vehicle 110 and second lane 104 was free, the information would include the message that no object is detected ahead of first vehicle 110 on roadway 100 and consequently that a passing maneuver is possible.

Figure 4:
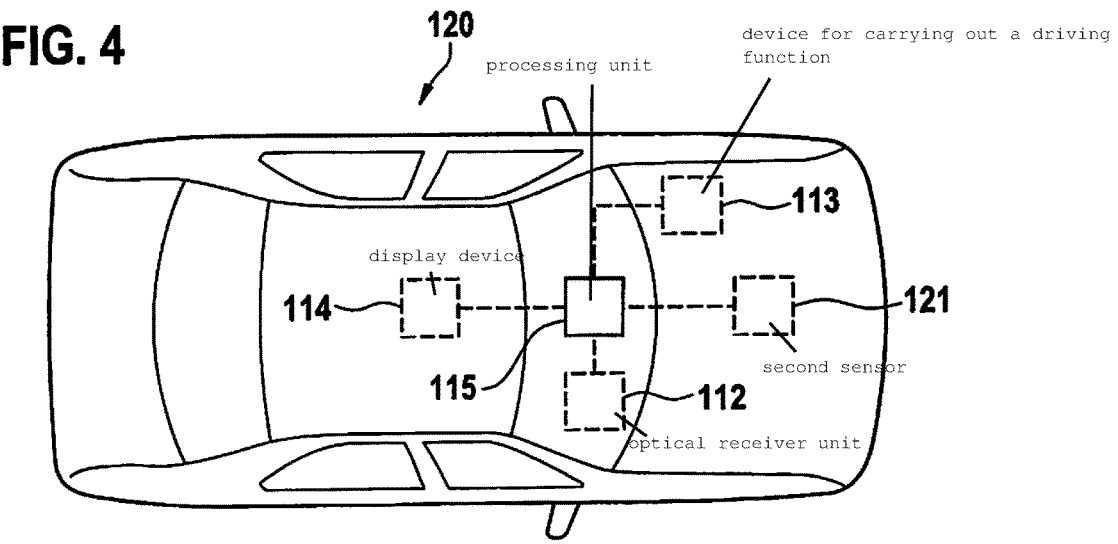
FIG. 4 schematically shows a vehicle.

FIG. 4 shows a second vehicle 120 including a processing unit 115 which is configured to carry out the method. Additional components are connected to processing unit 115 and are illustrated by dashed lines for the purpose of indicating that these do not necessarily have to be installed or do not necessarily have to be installed all together in second vehicle 120. In addition to processing unit 115, second vehicle 120 includes a second sensor 121, an optional receiver unit 112 and an optional device 113 for carrying out a driving function. In addition, second vehicle 120 may include an optional display device 114 inside second vehicle 120.

Device 113 for carrying out a driving function may take full control of vehicle 120 or assist a driver of vehicle 120, for example during steering or braking maneuvers.

Figure 5:
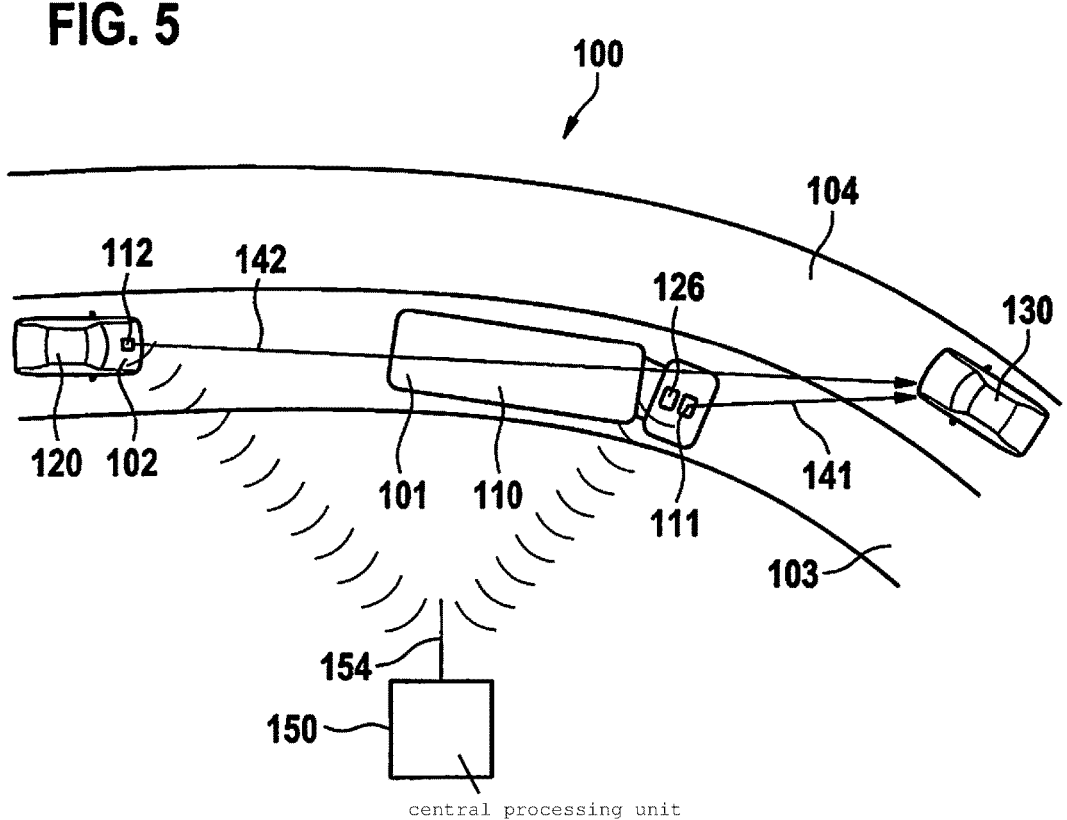
FIG. 5 schematically shows a course of the road where the method is carried out by a central processing unit.

FIG. 5 shows a course of the road 100, which generally corresponds to the course of the road of FIG. 1, including first vehicle 110, second vehicle 120, and third vehicle 130. In this exemplary embodiment, the method is, however, not carried out by a processing unit within one of vehicles 110, 120, but rather by an external processing unit 150. For this purpose, second vehicle 120 includes a transmitter unit 112 with the aid of which second position 102 of second vehicle 120 is relayed to central processing unit 150 via radio transmission. First vehicle 110 includes a transmitter unit 126 with the aid of which the data of first sensor 111 and first position 101 are relayed to central processing unit 150. The relayed data are received by central processing unit 150 with the aid of antenna 154 and the method is subsequently carried out within central processing unit 150. The first data of first sensor 110 [sic; 111], which include the distance and the direction between first vehicle 110 and third vehicle 130 and are represented by first vector 141, are transformed into a second distance and a second direction between second vehicle 120 and third vehicle 130, the second distance and the second direction being represented by second vector 142. The transformed data are subsequently output by central processing unit 150 with the aid of antenna 154.

In one exemplary embodiment, first vehicle 110 may include multiple first sensors 111 and/or second vehicle 120 may include multiple second sensors 121. Sensors 111, 121 then each ascertain raw data. The first data, which are represented by first vector 141, may include a fusion of the raw data ascertained with the aid of first sensors 111. The second data, which are represented by second vector 142, may include a fusion of the raw data ascertained with the aid of second sensors 121. The fusion of the raw data to form first or second data may be performed by a processing unit of vehicles 110, 120 in each case, similarly to FIGS. 1 and 2. Alternatively, the raw data may also be transmitted to central processing unit 150, the fusion of the raw data to form first or second data then being carried out by central processing unit 150.

In one exemplary embodiment, second vehicle 120 may include, similarly to FIG. 2, an additional second sensor 121, the second data of second sensor 121 also being relayed to central processing unit 150 with the aid of transmitter unit 112 using radio contact via antenna 154 and the method now also including the superimposition of the transformed data and of the second data.

In one specific embodiment, the first data and the second data include image data. For this purpose, first sensor 111 and second sensor 121 may be designed as cameras, for example. The transformed data include a conversion of a first perspective of first position 101 to a second perspective of second position 102. The transformed data and the second data are superimposed to form a fused image.

In one exemplary embodiment, the superimposed and/or the transformed data are output by central processing unit 150 to a vehicle with the aid of radio contact. This radio contact may be established by using antenna 154 if one of the vehicles has a receiver unit.

In one exemplary embodiment, it is computed by central processing unit 150 based on the superimposed and/or the transformed data whether a passing maneuver may be carried out by second vehicle 120. Information about a potential passing maneuver is transmitted to second vehicle 120. In the exemplary embodiment of FIG. 5, information is consequently transmitted indicating that a passing maneuver is not possible since third vehicle 130 is oncoming with respect to first vehicle 110 and second vehicle 120. If there is no third vehicle 130, it may be ascertained based on the transformed data of first sensor 111 that a passing maneuver is possible for second vehicle 120. Consequently, information indicating that a passing maneuver could be carried out would be output to second vehicle 120.

In one exemplary embodiment of the method, a signal quality of the second data is ascertained based on the transformed data and the second data and is output. This may be achieved, for example, by detecting and comparing traffic signs or other objects on roadway 100 or on the shoulder of roadway 100 with the aid of first sensor 111 as well as with the aid of second sensor 121. If deviations occur during the comparison of objects which were detected by the two sensors 111, 121, it is safe to assume that the signal quality of one of sensors 111, 121 is insufficient. Information about this insufficient quality of sensor 111, 121 may be subsequently output to alert a driver of a vehicle or a device for the automated performance of a driving function of the fact that the sensor system works insufficiently.

In one exemplary embodiment of the methods described in FIGS. 1 through 3 as well as 5, information about dangerous route segments is additionally provided in a map. First position 101 and/or second position 102 is/are compared to the information about dangerous route segments and a safety parameter is assigned to the transformed data based on the comparison. The safety parameter is subsequently output.

Dangerous route segments may be characterized as locations of accident hot spots. This means that statistical data about accident frequencies for these route segments for example indicate that the route segments are dangerous. Other indications for dangerous route segments may be speed limits and in particular changes in speed limits, crests, curves, or poorly visible roadway courses.

A device 113 for carrying out a driving function, as illustrated in FIG. 4, may be configured to take into consideration the safety parameter when carrying out the driving function. This may be achieved, for example, in that device 113 for carrying out a driving function relies less on the data transformed on the basis of the safety parameter when carrying out the driving function and relies more on the objects ascertained by the vehicle itself when carrying out the driving function. This may be achieved, for example, by reducing in terms of percentage the consideration of the transformed data down to a complete discounting of the transformed data.

Figure 6:
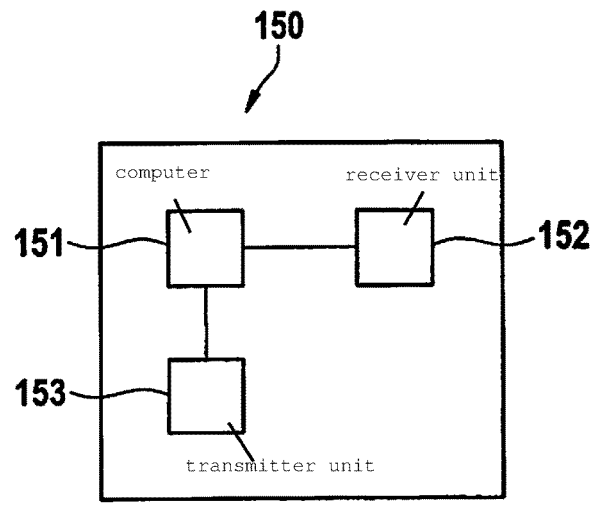
FIG. 6 schematically shows a processing unit.

FIG. 6 shows a central processing unit 150 which includes a computer 151, a receiver unit 152, and a transmitter unit 153 and which is configured to carry out the method illustrated in FIG. 5. Receiver unit 152 of FIG. 6 is in this case connected to antenna 154 of FIG. 5. A computer program, having program code, may be installed from a data carrier on computer 151. This computer program includes instructions by use of which the method may be carried out.

Figure 7:
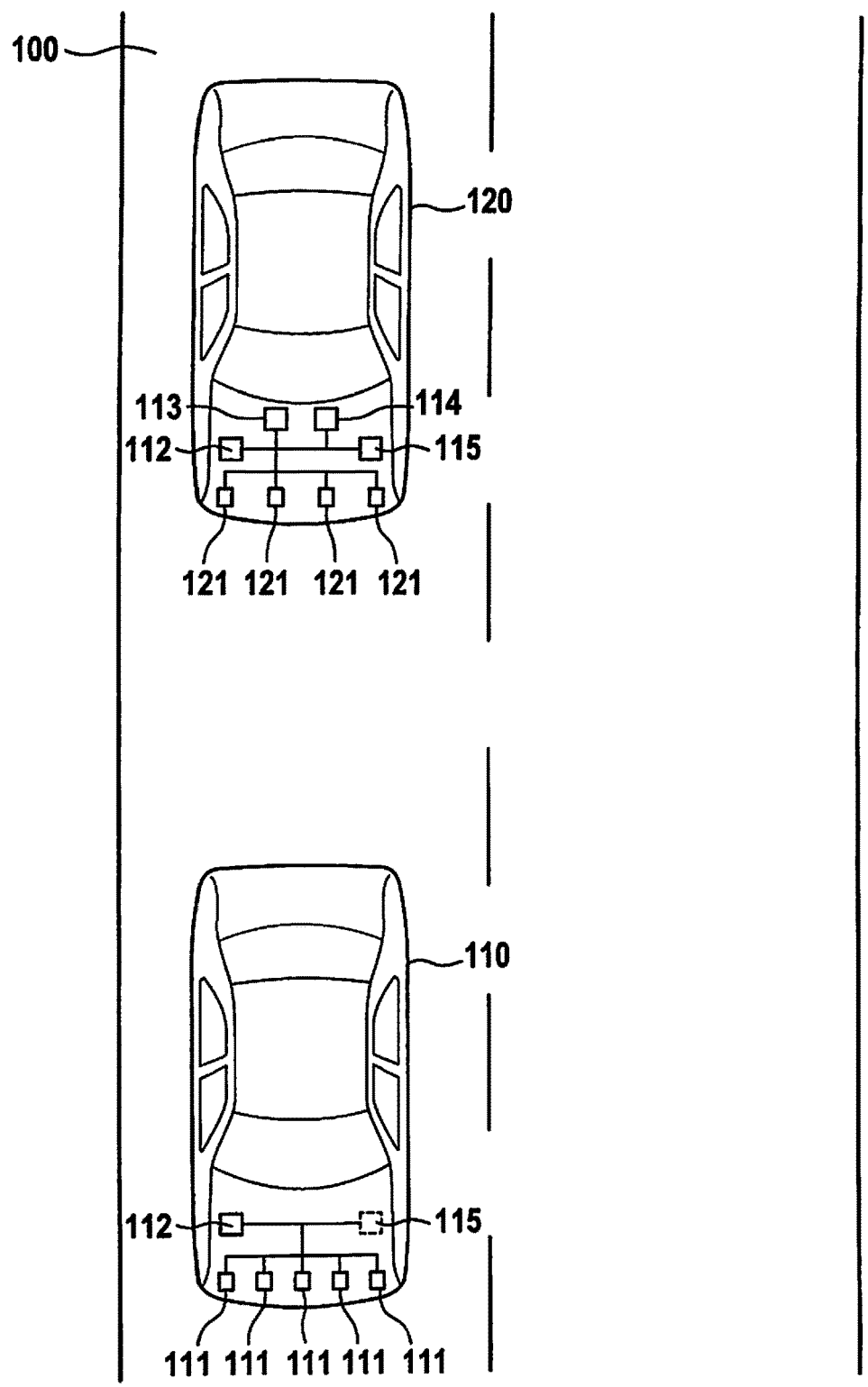
FIG. 7 schematically shows two vehicles carrying out the method.

FIG. 7 shows a first vehicle 110 and a second vehicle 120 on a course of the road 100. First vehicle 110 includes five first sensors 111 with the aid of which objects may be detected on course of the road 100 similarly to FIGS. 1 and 2. First sensors 111 may in this case be image sensors such as a camera, radar sensors, LIDAR sensors, or ultrasonic sensors, for example. Raw data of first sensors 111 may be relayed with the aid of a transceiver unit 112 to the second vehicle, the relay occurring via radio contact. Optionally, first vehicle 110 may include a processing unit 115 which is configured to fuse the raw data of first sensors 111. Alternatively or additionally to relaying the raw data of first sensors 111 to second vehicle 120, it may also be provided to relay the fused data to second vehicle 120 with the aid of transceiver unit 112.

Second vehicle 120 includes four second sensors 121 which may also be image sensors such as a camera, radar sensors, LIDAR sensors, or ultrasonic sensors, for example. Additionally, second vehicle 120 includes a transceiver unit 112 using which the raw data or the fused data of first vehicle 110 are received. In a processing unit 115 of the second vehicle, the received raw data of the first vehicle may now be compared to the raw data of second sensors 121 and the results may be used to ascertain distances and directions to the objects on the roadway. Alternatively or additionally, the fused data transmitted by processing unit 115 of first vehicle 110 may be compared to the raw data of second sensors 121 for the purpose of checking the distance and the direction to the objects. Alternatively, the raw data of second sensors 121 may be already fused by processing unit 115 of second vehicle 120 and contain distances and directions to objects, processing unit 115 of second vehicle 120 then also being able to carry out the comparison and a superimposition of the fused data of first sensors 111 and of second sensors 121.

Additionally, second vehicle 120 includes a device 113 for carrying out a driving function and/or a display device 114. The superimposed data may be taken into consideration by device 113 for carrying out a driving function. The superimposed data may be displayed by display device 114.

It may additionally be provided that processing unit 115 of second vehicle 120 carries out a weighting between 0% and 100% of the raw data of first sensors 111 and/or of the fused data of first sensors 111 and correspondingly relies less heavily on these data during the superimposition with the data of second sensors 121.

Although the present invention has been explained in greater detail using the preferred exemplary embodiments, other combinations of the mentioned features may also be provided by one skilled in the art without departing from the protective scope of the present invention.

What is claimed is:

1. A method for transforming data of at least one sensor, comprising:

providing first data, the first data having been ascertained with the aid of at least one sensor of a first vehicle, and a first position, the first data including a first distance and a first direction to an object, the first position including a location of the first vehicle at which the first data were ascertained;

providing a second position of a second vehicle;

converting the first data into transformed data based on the first position and the second position, the transformed data including a second distance and a second direction, the second distance being a distance between the object and the second position, the second direction being a direction between the object and the second position;

outputting the transformed data, wherein the first data having been ascertained by multiple sensors of the first vehicle, first raw data having been respectively ascertained by the sensors of the first vehicle, and the first data including a fusion of the first raw data of the sensors of the first vehicle;

providing second data, the second data having been ascertained by at least one sensor of the second vehicle, the second position including a location of the second vehicle at which the second data were ascertained;

superimposing the transformed data and the second data, the superimposed data being ascertained by the superimposition; and outputting the superimposed data, wherein a signal quality of the second data is ascertained based on the transformed data and the second data, and the signal quality is output.

2. The method as recited in claim 1, wherein the second data having been ascertained by multiple sensors of the second vehicle, second raw data having been respectively ascertained by the sensors of the second vehicle, and the second data including a fusion of the second raw data of the sensors of the second vehicle.

3. The method as recited in claim 1, wherein the converting of the first data is carried out by a processing unit of the second vehicle, the second data being provided by reading out the at least one sensor of the second vehicle, the second position being provided with the aid of a position sensor, the position sensor being installed in the second vehicle.

4. The method as recited in claim 3, wherein the first data and the second data include image data, the transformed data including a conversion of a first perspective of the first position of the first data into a second perspective of the second position, and the transformed data and the second data being superimposed to form a fused image.

5. The method as recited in claim 4, wherein the first data and the first position data are ascertained with the aid of an image sensor installed in the second vehicle.

6. The method as recited in claim 1, wherein the first data and the first position are received with the aid of a receiver unit of the second vehicle.

7. The method as recited in claim 1, wherein at least one of the superimposed data and the transformed data is displayed in the second vehicle.

8. The method as recited in claim 1, wherein at least one of the superimposed data and the transformed data is taken into consideration when carrying out a driving function of the second vehicle.

9. The method as recited in claim 1, further comprising:
determining, based on at least one of the superimposed data and the transformed data, whether the second vehicle is able to perform a passing maneuver, and information about a potential passing maneuver is output.

10. The method as recited in claim 1, wherein the method is carried out by a central processing unit, at least one of the first data, the first position, and the second position being received with the aid of a receiver unit of the central processing unit.

11. The method as recited in claim 1, wherein the method is carried out by a central processing unit, at least one of the first data, the first position, the second data, and the second position is received with the aid of a receiver unit of the central processing unit.

12. The method as recited in claim 11, wherein the first data and the second data including image data, the transformed data including a conversion of a first perspective of the first position of the first data into a second perspective of the second position, and the transformed data and the second data are superimposed to form a fused image.

13. The method as recited in claim 11, wherein at least one of the superimposed data and the transformed data is output to a vehicle by radio contact.

14. The method as recited in claim 13, further comprising:
determining, based on at least one of the superimposed data and the transformed data whether a passing maneuver may be carried out, and information about a potential passing maneuver is transmitted to a vehicle.

15. The method as recited in claim 1, wherein at least one of the first position and the second position is compared to information about dangerous route segments stored in a map, a safety parameter being assigned to the transformed data based on the comparison of at least one of the first position and the second position with the information stored in the map, and the safety parameter being output.

16. A processing unit configured to:
provide first data, the first data having been ascertained with the aid of at least one sensor of a first vehicle, and a first position, the first data including a first distance and a first direction to an object, the first position including a location of the first vehicle at which the first data were ascertained;

provide a second position of a second vehicle;

convert the first data into transformed data based on the first position and the second position, the transformed data including a second distance and a second direction, the second distance being a distance between the object and the second position, the second direction being a direction between the object and the second position; and output the transformed data, wherein the first data having been ascertained by multiple sensors of the first vehicle, first raw data having been respectively ascertained by the sensors of the first vehicle, and the first data including a fusion of the first raw data of the sensors of the first vehicle;

provide second data, the second data having been ascertained by at least one sensor of the second vehicle, the second position including a location of the second vehicle at which the second data were ascertained;

superimpose the transformed data and the second data, the superimposed data being ascertained by the superimposition; and output the superimposed data, wherein a signal quality of the second data is ascertained based on the transformed data and the second data, and the signal quality is output.

\* \* \* \* \*